Patented Jan. 12, 1937

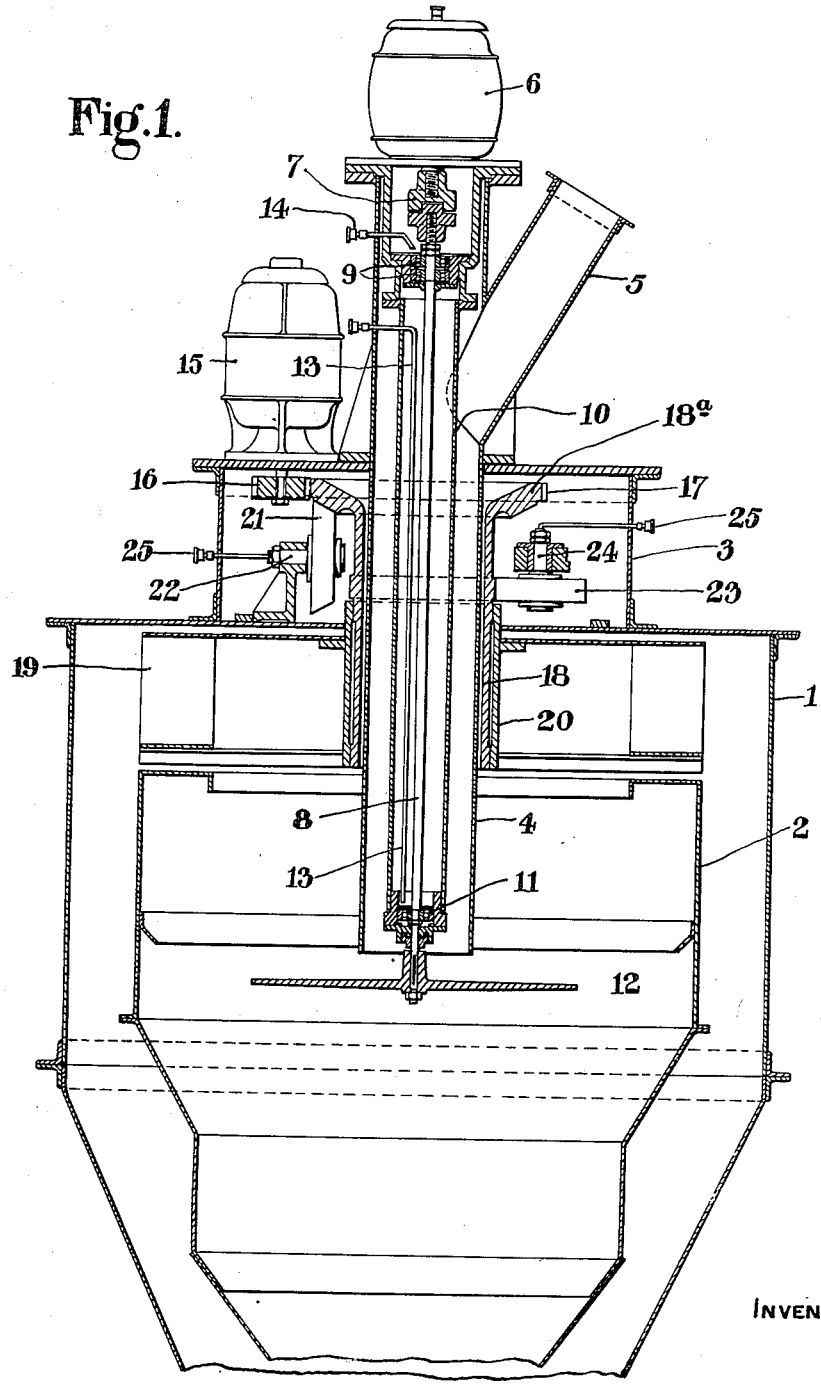

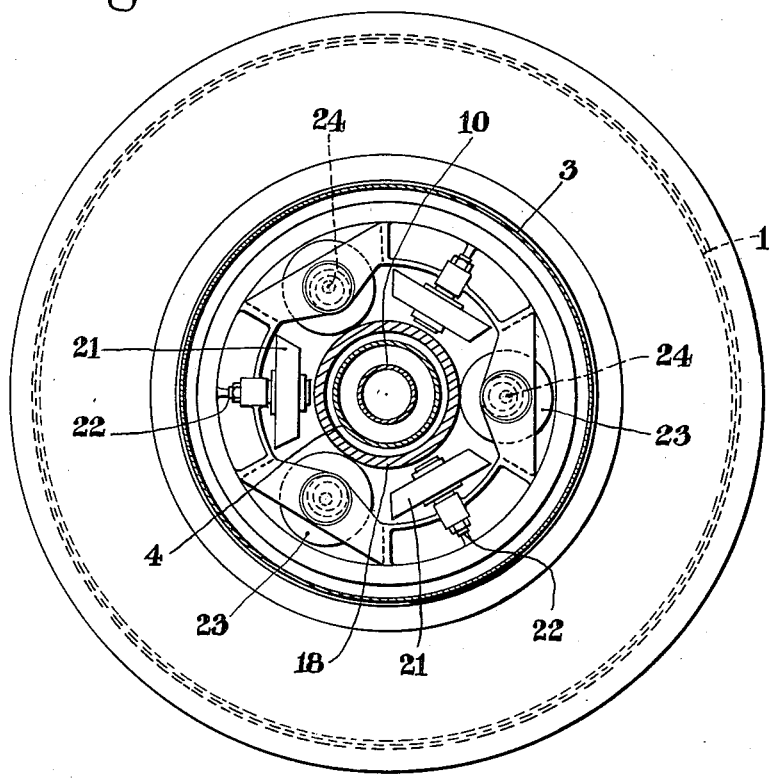

2,067,321

UNITED STATES PATENT OFFICE 2,067,321

PNEUMATIC APPARATUS FOR SEPARATING GRANULAR SUBSTANCES

Albin Berthold Helbig, Kaiserslautern, Germany, assignor of one-half to Victor Balzar Reichwald, Kent, England Application December 6, 1933, Serial No. 701,226
In Germany December 10, 1932

3 Claims. (Cl. 209—139)

The invention relates to pneumatic separating apparatus, commonly called air separators, for separating or sorting granular substances by the action of an air blast sucked or propelled by a fan past a spinning disk, onto which the material to be treated is fed, the axes of the fan and disk being vertical and in line. The disk or distributing plate projects the particles by centrifugal force into the air stream, which separates them by virtue of their different sizes and/or specific gravities.

There have been many proposals for constructing such apparatus with separate drives for the fan and the distributing plate. The desirability of separate drives on various important grounds is obvious. The efficiency of the apparatus when treating material of any given kind depends largely on the speed of the fan and the speed of the distributing plate, but it is far from the case that generally speaking both speeds should be equal, as they must be if the fan and plate are fixed to a common shaft. An inherent defect of a common drive, in practice, is the fact that it does not allow of separate regulation of speeds and sets far too low a limit to the speed at which the distributing disk can be driven, because the distributor speed desirable for some classes of work is much too high for the fan. The result is that the efficiency of the separating process falls off very considerably with increasing fineness of the powder to be separated.

I have established that even in respect of separating ultrafine powder efficiencies of the order of from 70 to 90% can be obtained, but generally speaking only on condition that the granluar material is flung off the disk in the form of a uniform veil spreading over the whole cross-section of the air stream. With a common drive of the fan and disk it is generally quite impracticable to give the disk the circumferential velocity required for this purpose. Apart from the difficulty of designing a fan to work efficiently at such speeds the cost of the bearings would be prohibitive, and effective lubrication without contamination of the powder would be practically impossible.

The object of my invention is to enable separate drive of the fan and disk to be effected, without complication in respect of bearings and general construction, without involving difficulty in respect of lubrication, and with complete freedom in respect of separately regulating the speeds of the fan and disk, enabling the latter to be driven with a circumferential velocity of the order of 100 feet per second, or more.

For this purpose I use, in combination with the usual vertical feed spout terminating above the disk and surrounding the driving shaft thereof, a fan having a hollow shaft or hub surrounding the spout, the fan and disk being separately driven, for example by separate, regulatable electromotors. The disk shaft within the spout preferably works, in accordance with common practice, within a tube preventing access thereto of the material fed through the spout.

For the disk shaft I may use ball bearings of the usual kind. For the fan shaft or hub surrounding the spout I may also use any convenient kind of bearings, but prefer roller bearings arranged in a manner to be described hereinafter.

An example of apparatus according to the invention is shown in the accompanying drawings, in which Fig. 1 is a vertical section thereof, and Fig. 2 a plan view of the bearings for the hub of the fan.

The apparatus has a casing 1 surrounding a hopper 2 and having upon it a housing 3, the purpose of which will be described hereinafter. A vertical feed spout 4 extends through the housing into the hopper, and has above the housing a lateral inlet 5 for the granular material. Seated upon a platform at the top of the spout is an electromotor 6, whereof the shaft extends through the platform into the spout, for driving by means of a clutch 7 a vertical shaft 8, which works in a ball bearing 9. From the cage of the ball bearing is suspended a tube 10 surrounding the shaft and having at its lower end another ball bearing 11 for the shaft. The shaft projects from the lower end of the spout and has fixed thereto a distributing disk 12, whereof the top surface is entirely smooth, contrary to the usual practice of using a ribbed disk. The cage of the ball bearing 11 closes the tube 10 at the bottom, enabling the bearing to be lubricated by means of oil fed through a tube 13, without contaminating the granular material. The lubricating tube 13 has at the top a rectangular bend, not visible in the drawings, and extends through the wall of the tube 10, and spout 4. There is also a lubricating tube 14 for the bearing 9.

Upon the housing 3 there is another electromotor 15, whereof the shaft extends through the top of the housing and has fixed thereto, in the housing, a pinion 16. The pinion meshes with a ring of teeth 17 on the hollow hub 18 of a fan 19, the hub passing through the top of the casing 1, which has for it a bearing 20. The bearings which in fact support and steady the hub are, however, in the housing 3. They comprise three taper rollers 21 with horizontal axles 22, and three cylindrical rollers 23 with vertical axles 24. The toothed flange 18a at the top of the hub rests on the rollers 21, and the rollers 23 steady the hub laterally. Three is the minimum number of rollers 21, and also of rollers 24, which can be used so as to afford support without a tendency to tilting. There are lubricating tubes 25 for the axles of the rollers. As these are outside the housing there is no risk of oil entering the hopper.

It will be seen that the drive of the disk 12 is wholly independent of that of the fan 19, so that the disk can be driven at any speed attainable by regulating the electromotor 6, with the fan rotating at any speed attainable by regulating the electromotor 15, and change of speed of either can be effected without interrupting the working of the separator.

The fan sucks air upwards through the hopper 2 and the stream of air carries upwards the dust flung off the disk 12, the dust being then flung outwards by the fan, and descending to the outlet of the casing 1. The grit too heavy to be carried upwards by the stream of air passes out at the bottom of the hopper, descending against the stream of air.

What I claim as my invention and desire to secure by Letters Patent of the United States is:—

1. A pneumatic separator comprising in combination a non-rotating vertical feed spout, a vertical shaft extending through said spout and having clearance around it for passage of the feed, a distributing disk fixed to the lower end of said shaft, a fan having a hollow hub surrounding said spout, a roller bearing surrounding said spout and supporting said hollow hub, driving mechanism for said fan located wholly outside said spout, and driving mechanism for said vertical shaft separate from said fan driving mechanism.

2. A pneumatic separator comprising in combination a non-rotating vertical feed spout, a vertical shaft extending through said spout and having clearance around it for passage of the feed, a distributing disk fixed to the lower end of said shaft, a fan having a hollow hub surrounding said spout, said hub having a circumferential flange, a set of at least three bearing rollers whereon said flange rests, a set of at least three rollers having vertical axes, forming lateral bearings for said hub, driving mechanism for said fan located wholly outside said spout, and driving mechanism for said vertical shaft separate from said fan driving mechanism.

3. A pneumatic separator comprising in combination a vertical feed spout, a vertical shaft extending through said spout and having clearance around it for passage of the feed, a distributing disk fixed to the lower end of said shaft, a fan having a hollow hub surrounding said spout, said hub having a circumferential flange, a set of at least three bearing rollers whereon said flange rests, lateral bearing means for said hub, driving mechanism for said fan located wholly outside said spout, and driving mechanism for said vertical shaft separate from said fan driving mechanism.

ALBIN BERTHOLD HELBIG.